UNITED STATES PATENT OFFICE.

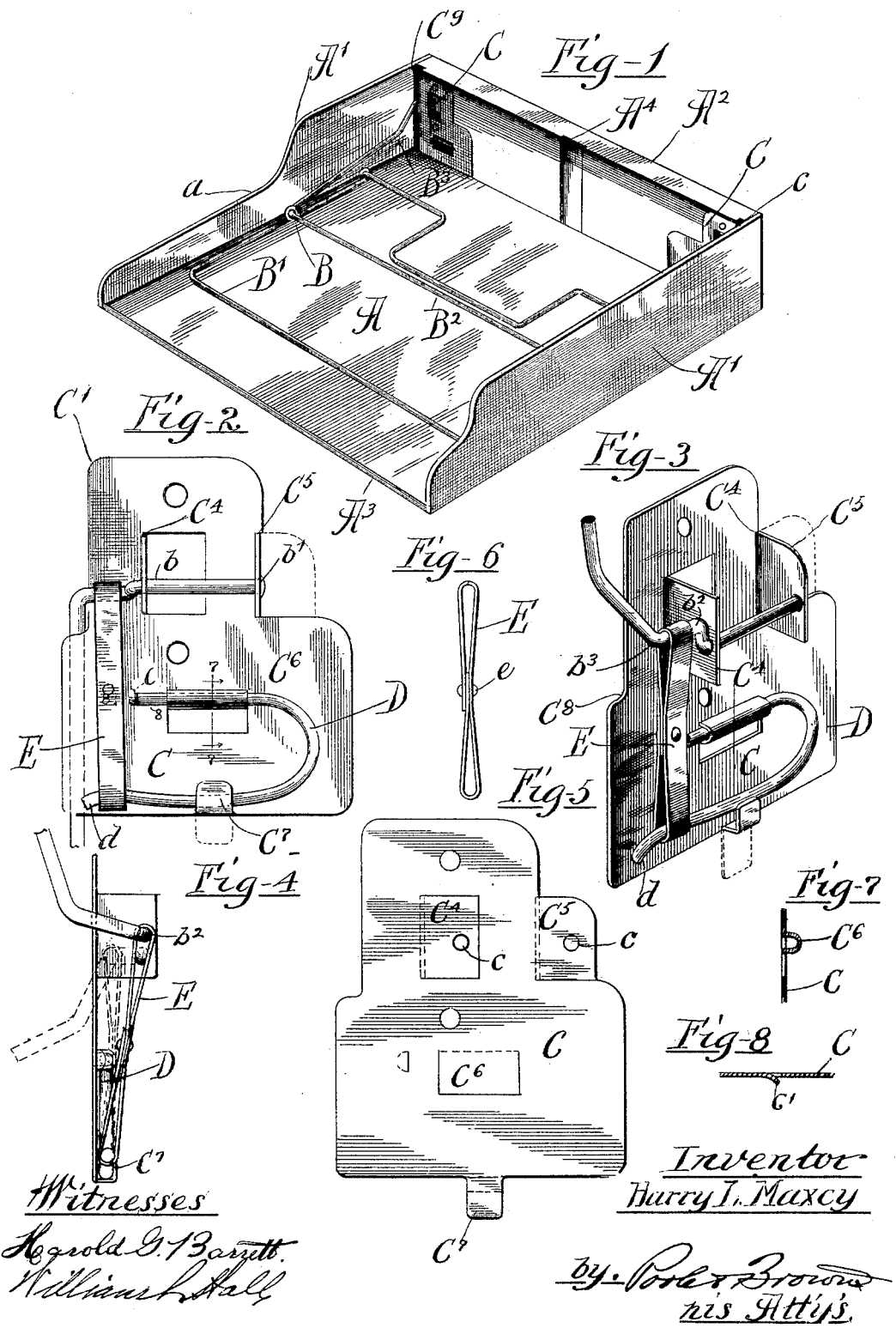

HARRY L. MAXCY, OF CHICAGO, ILLINOIS, ASSIGNOR TO THE COMMERCIAL LETTER FILE COMPANY, OF SAME PLACE.

DEVICE FOR SECURING BAILS IN FILING-RECEPTACLES.

SPECIFICATION forming part of Letters Patent No. 595,109, dated December 7, 1897.

Application filed December 12, 1896. Serial No. 615,520. (No model.)

*To all whom it may concern:*

Be it known that I, HARRY L. MAXCY, of Chicago, in the county of Cook and State of Illinois, have invented certain new and useful Improvements in Devices for Securing Bails in Filing-Receptacles; and I do hereby declare that the following is a full, clear, and exact description thereof, reference being had to the accompanying drawings, and to the letters of reference marked thereon, which form a part of this specification.

This invention relates to improvements in cabinet-files, designed for filing letters and other papers, comprising a case having a plurality of shallow boxes or receptacles open at one side and the top thereof and which are provided with a series of index-sheets between which the papers to be filed are placed, and also provided with a spring-pressed bail normally operating to hold down the index-sheets and papers between the same, but which may be swung upwardly to permit free access of the papers when desired.

The invention relates more specifically to an improved construction of the means for actuating the presser-bail, whereby said bail may be pressed firmly down upon the index-sheets to securely hold the papers contained within the same and by which it may also be swung upwardly away from said sheets and held in said position by the tension of the actuating-spring.

The invention consists in the matters hereinafter set forth and more particularly pointed out in the appended claims, and is illustrated in the accompanying drawings, in which—

Figure 1 is a perspective view of a filing-receptacle provided with my invention. Fig. 2 is a rear elevation of the bail-actuating devices and the plate on which they are mounted, showing the bail in its lower position. Fig. 3 is a perspective view thereof, showing the bail in its elevated position. Fig. 4 is a side elevation of the same, showing the bail in its elevated position. Fig. 5 is a view of the blank from which the supporting-plate of the bail-actuating devices is made. Fig. 6 is a side elevation of the link forming the connection between the bail and its actuating-spring. Fig. 7 is a section taken on line 7 7 of Fig. 2. Fig. 8 is a section taken on line 8 8 of Fig. 2.

In said drawings, A designates the box as a whole, comprising side walls $A'$ $A'$, rear wall $A^2$, and bottom wall $A^3$. One of said side walls $A'$ is shown as cut away at $a$ to afford room for the arm of the user when filing documents in said case.

$A^4$ designates a vertical recess in the rear wall $A^2$, adapted for the reception of the clip, by which the index-sheets may be removably secured to the box.

B designates a presser-bail comprising a body portion $B'$, formed of a single piece of wire, a cross-bar $B^2$, to which said body portion is secured, and rearwardly-extending arms $B^3$, said cross-bar and arms being formed integrally. Said arms $B^3$ are pivotally secured to the rear wall $A^2$ at each end thereof in such manner that the bail may be swung upwardly away from the index-sheets, so as to be entirely out of the way when access is desired to be had to the papers filed therein.

The device thus far described may be of any common or preferred construction, as it has no reference to my invention.

C designates as a whole the bail-actuating device. It is to be understood that the actuating devices at each side of the box are exact duplicates, so that the following description thereof will apply to both. Said device consists generally of a supporting-plate $C'$, to which the bail is pivoted, a spring D, secured to the plate, and a connecting-link E, connecting the bail with the free end of the spring. The plate $C'$ is preferably stamped from a single piece of sheet metal by any suitable stamping process. Fig. 5 shows the shape of said plate after cutting and before the various parts are bent up into their proper shape, the full lines designating lines which have been cut through and the dotted lines the lines upon which the parts are bent. The upper part of said supporting-plate is provided with two parallel extensions $C^4$ $C^5$, struck up at right angles to the plate, each provided with an aperture $c$, within which is journaled the free horizontal end $b$ of the bail-arm $B^3$. The extreme end of said bail is upset, as shown at $b'$, in order that it may not be withdrawn from its bearings. Said bail-arm B³ is provided with a part $b^2$, adjacent the bearing $c^4$, bent at right angles to the horizontal portion $b$ and extending horizontally toward the front of the box when the bail is in its lowermost position, and with a part $b^3$, bent at right angles to said part $b^2$ and standing parallel with the horizontal portion $b$, said parts $b^2$ and $b^3$ forming a crank in the bail-arm adjacent the bearing $c^4$, by which the bail is actuated, as hereinafter to be described.

The bail-arm B³ is extended forwardly from the horizontal arm $b^3$ of the crank to its point of connection with the body portion thereof.

D designates a U-shaped spring rigidly secured at one end to the lower part of the supporting-plate C by means of a clip $C^6$, struck up from said plate C, (shown more clearly in Fig. 7,) the free end thereof lying adjacent to the lower edge of said plate.

$c'$ designates a stop struck up from the plate C adjacent to the attached end of the spring D, which is adapted to prevent longitudinal movement of said spring within its clip.

$C^7$ designates a guide-finger made integral with the plate C and bent upon said plate, as shown in Figs. 2 and 3, which determines the limit of the outward movement of the free end of the spring and also prevents the same from moving laterally away from the plate C in the manipulation of the bail.

E designates a link which is adapted to connect the horizontal arm of the crank of the bail-arm with the free end of the spring, through the medium of which spring said bail-arm is actuated. Said link is shown as formed of a single strip of sheet metal bent upon itself, so that a single rivet $e$, passing through the center and ends thereof, binds the same securely together. Said link may be placed over the crank-arm $b^3$ before the rivet $e$ is placed therein, or the completed link may be placed thereon before the bail-arm is secured in its bearing, as desired. The free end of the spring is provided with a downwardly-extending hooked portion $d$, designed to prevent the link E from slipping therefrom when tension is put on the spring and when the free end thereof stands in a horizontal plane above the portion of the spring between said end and the U-shaped bend thereof, as when tension is put upon the spring by raising the bail the link tends to slip outwardly off the spring.

The plate C is cut away at $C^8$ to provide a space $C^9$ between the same and the side of the box to allow the bail-arm B³ to pass therethrough and to also allow room for said arm when the bail is swung upwardly.

It will be noted that when the bail is in its normal or lowermost position, as shown in Figs. 1 and 2, the crank member $b^2$ will stand in a substantially horizontal position, and the link E being shorter than the distance between said member $b^2$ and the horizontal portion of the finger-guard $C^7$ said bail will receive the full force of the spring and the index-sheets, and their contents will be therefore held firmly down upon the bottom A of the box. When the bail is swung upward, it will be raised against the full action of the spring until the crank member $b^2$ assumes a vertical position, when said crank will be on a dead-center, so that it will move in neither direction under the action of the spring, and upon being swung farther backward the force of the spring will be applied upon the opposite side of the crank, but the bail will be prevented swinging backwardly by its contact with the back $A^2$ of the box, and will consequently be held in such position. Fig. 3 shows the bail in such position, where it will be held by the action of the spring when access is desired to the papers in the file.

The back member $A^2$ of the box will be suitably recessed to provide space for the bail-actuating mechanism described, and said plate C will be usually set in said back, so as to lie flush with the inner surface thereof.

It is to be understood that the particular form of spring herein described is not essential, as I may use any form of spring found convenient or desirable, nor is the particular form of link shown essential, as such connection will necessarily be designed for use with any particular form of spring used.

While I have shown and described the bail-actuating devices as located in the rear wall of the filing-receptacle, it will be understood that this location is not essential to the practical operation of my invention, but that said devices may be equally well located in the side wall thereof.

A device embodying my invention will be found to be of economical construction, easy of application to the file box or receptacle, and positive in its action. It has no complicated parts to get easily out of order and is capable of the maximum endurance.

I claim as my invention—

1. In a filing-receptacle, having a recess in the inner face of its rear wall, the combination with a bail-arm pivotally mounted in said recess and provided with a crank adjacent its point of bearing, of a plate covering said recess, a U-shaped spring mounted on said plate below the pivotal bearing of the bail-arm and a link connecting the free end of the spring with the crank of said arm whereby said crank will be actuated by said spring.

2. In combination with a filing-receptacle having a recess in the inner face of one of its walls, of a plate mounted in said recess, a bail-arm pivotally secured in said plate, provided near its pivotal bearing with a crank portion, a U-shaped spring mounted upon said plate, operative connections between the free arm of the spring and said crank portion and a guide on the plate engaging said free arm to prevent lateral movement of the same on the plate.

3. As a new article of manufacture, the device for securing the swinging arm of a bail to a filing-receptacle, consisting of a plate of generally rectangular form, provided near one end with two parallel bail-supporting members, extending at right angles to the plate, a clip near the center thereof adapted to support the bail-actuating spring, and with a guard on its opposite end to prevent lateral movement of the actuating-spring, said parts being stamped from a single piece of metal.

4. In a filing-receptacle, the combination with the inner face of the rear wall thereof, of a plate secured to said wall and adapted to cover the recess provided with integral rearwardly-extending members to which the bail-arm is pivotally connected, and a clip integral with said plate, a U-shaped spring mounted in said clip and a link extending between the free end of the spring and the bail-arm.

5. In combination with a filing-receptacle provided with a recess in the inner face of its rear wall, of a plate mounted in said recess, a bail-arm pivotally secured to the plate, a U-shaped spring mounted on the plate below the pivotal bearing of the bail-arm, and a connecting-link between the free end of the spring and bail-arm, said free end of the spring being formed with a downwardly-extending hook to prevent said link from slipping therefrom when tension is put upon the spring.

6. In combination with a filing-receptacle provided with a recess in the inner face of one of its walls, of a plate mounted in said recess, a bail-arm pivotally secured to said plate, a U-shaped spring mounted on the plate below the pivotal bearing of the bail-arm, a stop on the plate adjacent the point of connection with the spring therewith, to prevent longitudinal movement of the spring, and operative connections between the opposite arm of the spring and the bail-arm.

7. In combination with a filing-receptacle provided with a recess in the inner face of one of its walls, of a plate mounted in said recess, a bail-arm pivotally secured to said plate, a U-shaped spring mounted on the plate below the pivotal bearing of the bail-arm and secured thereto by an integral clip struck up from the plate which engages one of the arms of the spring, a stop also struck up from the plate adjacent the said integral clip to prevent longitudinal movement of the spring upon the plate and operative connections between the free arm of the spring and the bail-arm.

In testimony that I claim the foregoing as my invention I affix my signature, in presence of two witnesses, this 10th day of December, A. D. 1896.

HARRY L. MAXCY.

Witnesses:
LILLIAN GRAY,
WILLIAM L. HALL.